United States Patent [19]

Sheill

[11] Patent Number: 4,516,666
[45] Date of Patent: May 14, 1985

[54] DISC BRAKE ANTI-RATTLE MEANS

[75] Inventor: David D. Sheill, Farmington Hills, Mich.

[73] Assignee: Rockwell International Corporation, Pittsburgh, Pa.

[21] Appl. No.: 623,864

[22] Filed: Jun. 25, 1984

Related U.S. Application Data

[63] Continuation of Ser. No. 487,551, Apr. 22, 1983, abandoned, which is a continuation of Ser. No. 212,003, Dec. 1, 1980, abandoned.

[51] Int. Cl.³ .............................................. F16D 65/40
[52] U.S. Cl. ................................ 188/73.38; 188/73.1; 188/73.32; 188/73.45
[58] Field of Search ............... 188/73.31, 73.32, 73.35, 188/73.36, 73.37, 73.38, 73.39, 73.1, 76, 205 A, 250 B

[56] References Cited

U.S. PATENT DOCUMENTS

| | | | |
|---|---|---|---|
| 2,660,748 | 12/1953 | Gaumer | 267/182 X |
| 3,403,756 | 10/1968 | Thirion | 188/205 A X |
| 3,421,602 | 1/1969 | Craske | 188/73.35 X |
| 3,451,509 | 6/1969 | DeHoff | 188/73.35 |
| 3,602,328 | 8/1971 | Fannin et al. | 188/73.32 X |
| 4,027,749 | 6/1977 | Yamamoto et al. | 188/73.31 |
| 4,055,237 | 10/1977 | Numazawa et al. | 188/73.35 |
| 4,245,723 | 1/1981 | Moriya | 188/73.38 X |
| 4,289,216 | 9/1981 | Shirai et al. | 188/73.1 X |

FOREIGN PATENT DOCUMENTS

| | | | |
|---|---|---|---|
| 2252156 | 5/1974 | Fed. Rep. of Germany | 188/73.38 |
| 2451604 | 5/1975 | Fed. Rep. of Germany | 188/73.1 |
| 2809383 | 9/1979 | Fed. Rep. of Germany | 188/73.38 |
| Ad.86075 | 10/1965 | France | 188/73.36 |
| 36695 | 1/1966 | Japan | 188/73.32 |
| 163336 | 12/1980 | Japan | 188/73.38 |
| 1250458 | 10/1971 | United Kingdom | 188/73.38 |

Primary Examiner—George E. A. Halvosa

[57] ABSTRACT

An anti-rattle clip is comprised of a length of spring wire formed to provide two spaced clip legs joined by an intermediate segment. Each clip leg is formed adjacent the intermediate segment to abut spaced areas of the radially outer edge of a friction pad backing plate and the ends of the clip legs are formed to abut spaced areas of the radially outer edge of the other friction pad backing plate. Segments of the clip legs between the segments abutting the friction pad backing plates are formed to extend radially inward and under the circumferentially spaced edges of an aperture provided to the disc brake caliper bridge.

3 Claims, 4 Drawing Figures

DISC BRAKE ANTI-RATTLE MEANS

This application is a continuation of application Ser. No. 487,551, filed 4/22/83, which is a continuation of application Ser No. 212,003 filed 12/1/80, both now abandoned.

BACKGROUND OF THE INVENTION

1. Field of the Invention

The present invention relates to a disc brake assembly and more specifically to an improved means for biasing friction pads into abutment with supporting means in the disc brake assembly.

The present invention is particularly applicable to a disc brake assembly of the type which includes a rotor or disc mounted for rotation with a vehicle wheel and a floating caliper straddling the periphery of the rotor. The caliper is usually mounted on a support or torque plate by means permitting movement of the caliper in an axial direction relative to the torque plate and rotor. Brake pads are carried by the caliper on opposite sides of the rotor and are movable into contact with oppositely disposed friction braking surfaces of the rotor by means of a suitable actuating mechanism which is usually driven by a fluid motor. In a floating caliper disc brake, each friction pad is located intermediate one leg of the caliper and the adjacent friction surface of the rotor. The brake pad supporting means is designed to permit axial movement of the brake pads and, without further restraint, the friction pads may vibrate against the supporting means or "rattle" when the assembly is not actuated. The actuating mechanism is usually carried by one leg of the caliper and serves to move the friction pad adjacent to that leg axially into contact with the rotor, the reaction force of the contact serving to draw the other leg of the caliper and the other friction pad into contact with the opposite surface of the rotor.

2. Description of the Prior Art

Various anti-rattle devices for disc brake friction pads are disclosed in U.S. Pat. Nos. 4,194,597; 3,056,174; 3,972,393; 4,049,087 and 3,027,751. Some of these require means such as rivets, apertures or recesses on the friction pad assembly for attaching the anti-rattle device to the friction pad. Other anti-rattle devices are disposed between the friction pad backing plate edge and the supporting means and are not readily accessible for removal or replacement.

The present invention avoids these problems by providing an anti-rattle spring clip easily accessible for removal and replacement purposes which does not require special attaching means on the friction pad backing plates.

SUMMARY OF THE INVENTION

The present invention provides a disc brake for a vehicle comprising a rotor having axially spaced friction braking surfaces, a caliper including a leg extending radially inward adjacent a friction surface of the rotor, a wall extending radially inward adjacent the other friction surface of the rotor and a bridge straddling the periphery of the rotor and joining the leg and the wall. Load applying means are carried by the wall. A pair of friction pads are carried by the caliper with each of the pads extending radially inward adjacent one friction surface of the rotor. Each friction pad is comprised of a backing plate having a radially outer edge and friction material secured to a part of the backing plate. An aperture in the bridge is defined on two sides by circumferentially spaced, axially extending, radially converging edges which mount the friction pads for axial movement and an anti-rattle element in the aperture having means formed to abut the radially outer edges of the friction pad backing plates and other means formed to extend under the radially converging edges of the aperture to spring load the means abutting the friction pad backing plates thereby urging the friction pad backing plates into anti-rattle abutment with the radially converging edges of said aperture.

In the preferred embodiment, the anti-rattle element is a spring clip formed to provide two spaced clip legs joined by an intermediate segment, each of the clip legs adjacent the intermediate segment being formed to abut circumferentially spaced areas of the radially outer edge of one friction pad backing plate, the ends of the clip legs formed to abut circumferentially spaced areas of the radially outer edge of the other friction pad backing plate and segments of the clip legs between the portions abutting the friction pad backing plates are formed to extend radially inward and under the radially converging edges of the aperture.

The advantages offered by the present invention will become apparent from the following description of the embodiment shown in the accompanying drawings.

DESCRIPTION OF THE DRAWINGS

In the drawings, wherein like reference numerals refer to like parts.

DESCRIPTION OF THE INVENTION

Figure 1:
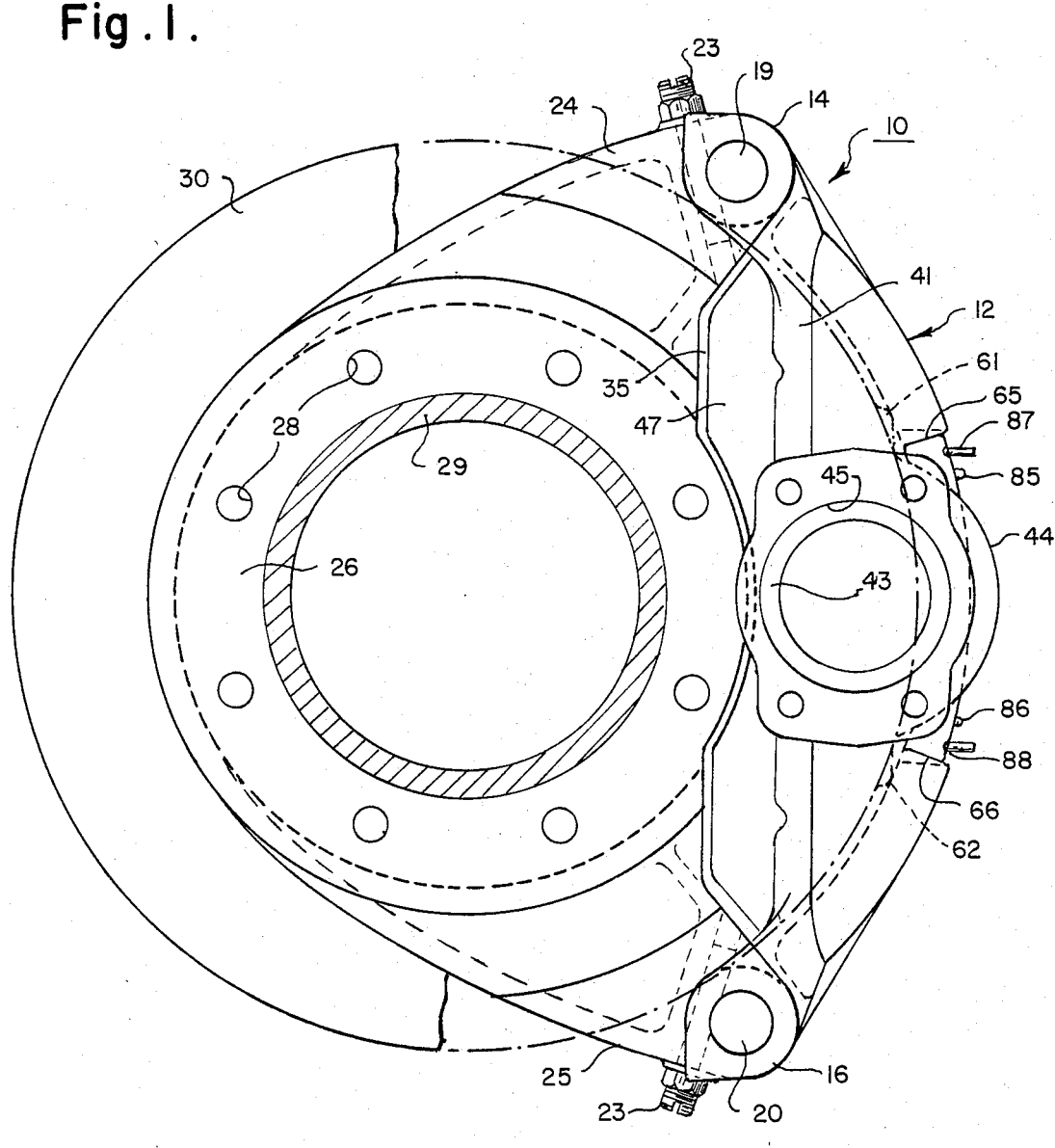
FIG. 1 is a side elevation of a disc brake incorporating the present invention.
Figure 2:
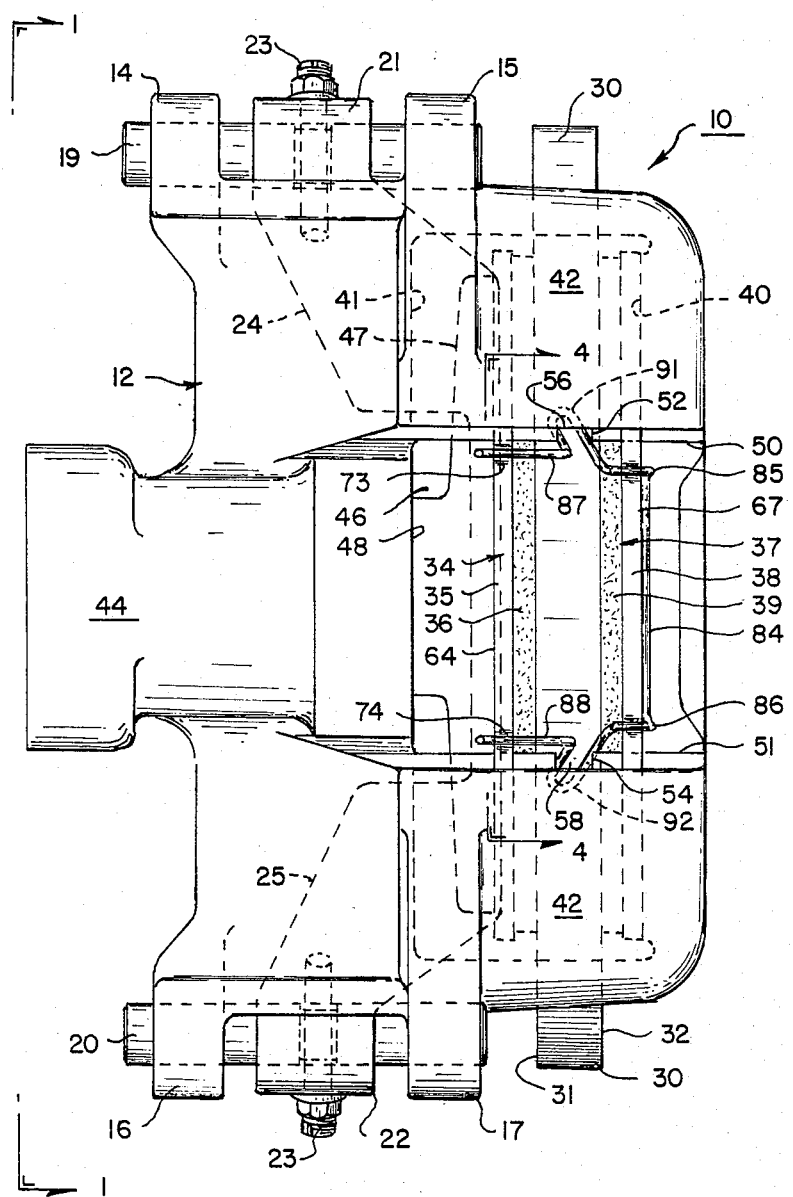
FIG. 2 is a front elevation view of the disc brake assembly of FIG. 1.

With reference to the drawings, FIG. 1 taken along line 1—1 of FIG. 2, and FIG. 2 show a disc brake assembly generally designated by the numeral 10. The assembly 10 includes a floating caliper 12 mounted by means of circumferentially spaced, axially aligned pairs of bosses 14 and 15, and 16 and 17 on slide pins 19 and 20. The slide pins 19 and 20 are respectively secured by a draw keys 23 within bores provided to bosses 21, 22 at the radially outer extremities of circumferentially spaced, radially extending arms 24, 25 of the brake supporting torque plate or spider 26. The torque plate 26 is provided with a circular array of apertures 28 which receive a plurality of bolts not shown which in turn secure the support or torque plate 26 to a flange welded to a vehicle axle 29. The torque plate 26 could of course be welded directly to the axle 29. A rotor 30 having axially spaced, radially extending, oppositely disposed friction braking surfaces 31 and 32 is secured for rotation with a wheel hub (not shown) carried by the vehicle axle 29 adjacent the disc brake assembly 10.

The caliper 12 is a cast metal component comprised of a depending leg 40 extending radially inward adjacent the friction surface 32 of rotor 30, an oppositely disposed depending leg or wall 41 adjacent the friction surface 31 of rotor 30 and a bridge 42 straddling the periphery of rotor 30 and joining the leg 40 to the wall 41. The wall 41 is formed with a generally cylindrical housing 44 having a bore 45 slidably mounting a piston 43 formed integrally with a load applying plate 47. The contour of the load plate 47 is similar to the contour of the backing plate 35 of the friction pad 34 and moves the pad 34 axially into contact with the rotor friction surface 31 in response to actuation of the brame assembly. The piston 43 and load plate 47 may be moved by suitable hydraulic or mechanical actuating means, not shown. The bridge 42 of caliper 12 is provided with an aperture 46 defined by a radially disposed edge 48 and a pair of circumferentially spaced, axially extending, radially converging edges 50 and 51. The circumferentially spaced edges 50, 51 converge in a radial direction at an included angle of about 32 degrees. The circumferentially spaced edges 50, 51 are each provided with a slot 52, 54. The bottoms 56, 58 of the slots 52, 54 are substantially parallel and the slots 42, 54 are located radially outward from the periphery of the rotor 30 so as to extend at least partly across the periphery of the rotor 30 as best shown by FIG. 2.

Friction pads 34, 37 are respectively comprised of backing plates 35, 38 with friction material 36, 39 secured thereto. The backing plates 38 also include abutment surfaces 61, 62 adjacent the radially converging edges 65 and 66, respectively. The abutment surfaces 71, 72 extend only a short radial distance relative to the length of the radially converging edges 65 and 66. The friction pads 34, 37 are axially located between the depending portions 40, 41 of the caliper 12. Friction pad 34 is axially located between the load plate 47 and friction surface 31 of the rotor 30. Friction pad 37 is axially located between the friction surface 32 of rotor 30 and the caliper leg 40. In FIGS. 1 and 2, the friction pads 34, 37 are shown operatively located adjacent the oppositely disposed friction surfaces 31, 32 of rotor 30 with the friction material 36, 39, respectively, facing the surfaces 31, 32.

The friction pads 34, 37 are supported by means of radially extending tabs 64 and 67. The friction pad backing plate tabs 64 and 67 are respectively bounded by circumferentially spaced, radially converging edges 65, 66 and 68, 69 which are slidably carried by the circumferentially spaced edges 50, 51 of the caliper aperture 46. Shallow slots 73, 74 and 75, 76 are provided to the radially outer edges of friction pad tabs 64 and 67, respectively. The circumferentially spaced edges 65, 66 of friction pad tab 64 and edges 68, 69 of friction pad tab 67 converge at an angle substantially the same as the included angle provided to the radially converging edges 50, 51 of caliper aperture 46 to permit the friction pad tabs 64 and 67 to slide freely along the edges 50 and 51. The abutment surfaces 61, 62 of friction pad backing plate 35 and the abutment surfaces 71, 72 of backing plate 38 abut the radially inner surface 13 of the caliper 12 adjacent the aperture edges 50, 51 to radially locate the friction pads relative to the surface 13. The circumferentially spaced, axially extending, radially converging edges 50, 51 of caliper aperture 46 thus support the tabs 64, 67 of friction pads 34, 37 in their respective operative positions adjacent the oppositely disposed friction surfaces of the rotor 30.

The slots 52, 54 are respectively provided through the circumferentially spaced edges 50, 51 to provide an additional clearance or length which when taken together with the circumferential length of the caliper aperture 46, is adequate to radially inwardly pass the tabs 64, 67, respectively, of friction pads 34, 37 and thereby permit installation and removal of the friction pads 34, 37. The width of the slots 52, 54 is slightly greater than the thickness of the friction pad backing plate tabs 64, 67 and the slots 52, 54 are axially located radially outward of the periphery of the rotor 30 to prevent the backing plate tabs 64, 67 from accidentally or inadvertently becoming aligned with the access slots 52, 54 when the friction pads 34, 37 are respectively in their operative positions adjacent the oppositely disposed friction surfaces 31, 32 of rotor 30.

Figure 3:
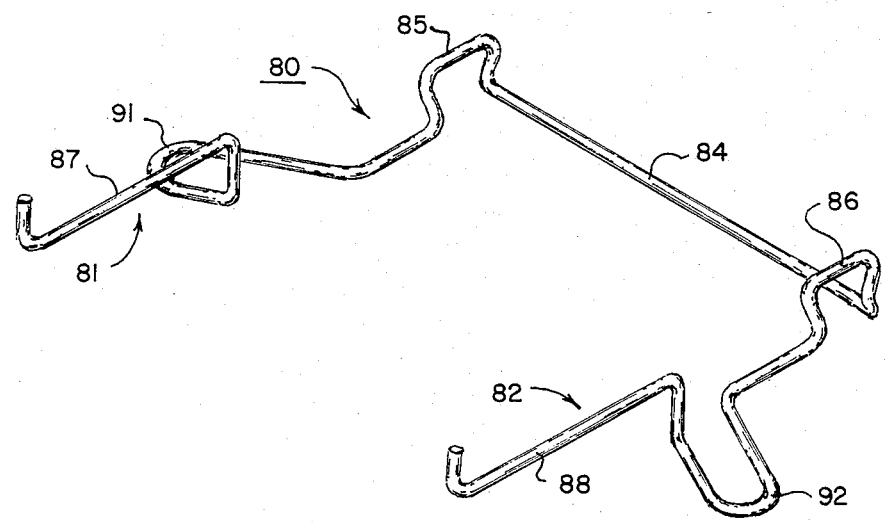
FIG. 3 is a perspective view of the anti-rattle spring clip.

An anti-rattle spring clip 80 is disposed within the aperture 46. As best shown by FIG. 3, the anti-rattle clip 80 is preferably formed from a continuous length of spring steel wire to provide two spaced leg segments 81, 82 joined by an intermediate segment 84. The clip legs 81 and 82 are respectively formed adjacent the intermediate segment 84 to provide raised U-shaped bends 85 and 86 adapted to abut circumferentially spaced areas of the radially outer edge of friction pad tab 67. The distal ends 87, 88 of the clip legs are raised to the same level as the bends 85, 86 to abut circumferentially spaced areas of the radially outer edge of friction pad tab 64. The clip leg ends 87, 88 are substantially coplanar with the closed end of the U-shaped bends 85, 86. The leg ends 87, 88 extend a substantial distance, approximately 5.5 centimeters, to permit the friction pad 34 to move toward the friction pad 37 while maintaining contact between the leg ends 87, 88 and friction pad tab 64 as the friction living material wears.

Figure 4:
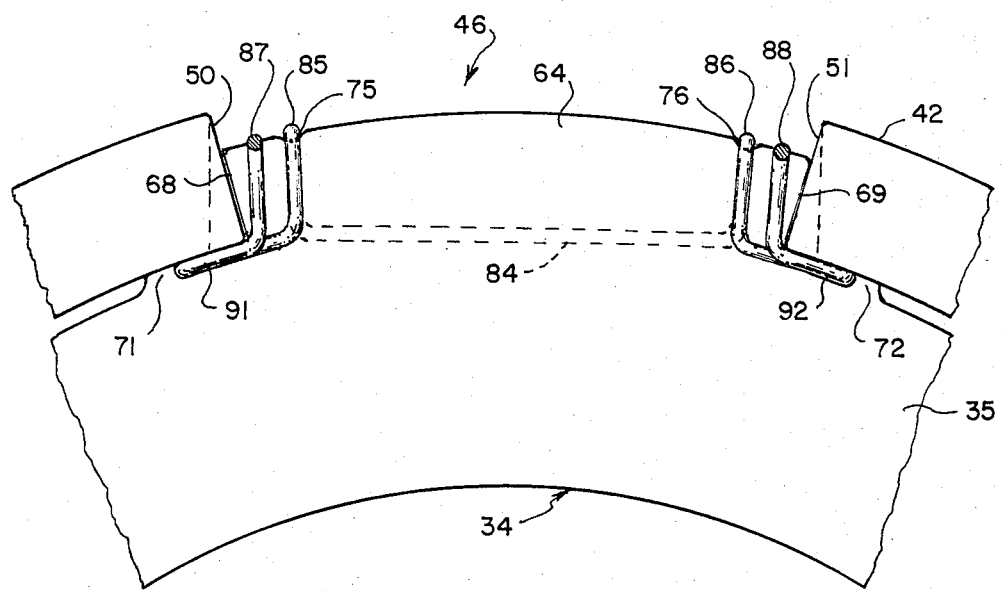
FIG. 4 is a view partly in section taken along the line 4—4 of FIG. 2.

The clip legs 81, 82 are respectively formed intermediate the U-bends 85, 86 and the ends 87, 88 with laterally projecting stabilizing means 91, 92. The stabilizing means 91, 92 are formed to extend away from each other in substantially the same plane which is spaced downward or radially inward (FIG. 4) from the plane of the U-bends 85, 86 and the leg ends 87, 88. As best shown by FIGS. 2 and 4, the stabilizing means 91, 92 extend under the aperture edges 50, 51 to engage the undersurface of the caliper bridge 42. This torsionally loads the spring clip 80 and provides a force in U-bends 85, 86 and leg ends 87, 88 biasing the tabs 64 and 67 radially inward to force the circumferentially spaced edge of the tabs into abutment with the aperture edges 50, 51.

The spring clip 80 may be easily installed by disposing the U-bends 85, 86 over the radially outer edge of the friction pad tab 67 until they seat in the grooves 75, 76. One of the stabilizing means 91, 92 is positioned under its corresponding aperture edge and the clip leg ends are moved toward one another until the other stabilizing means clears its corresponding aperture edge and can be released to extend laterally beneath that edge surface. The leg ends 87, 88 are then seated in the shallow grooves 73, 74 provided to the radially outer edge of friction pad tab 64.

The present invention thus provides a simple economical means for biasing the friction pads into bearing abutment with supporting edges of the caliper aperture to prevent the friction pad backing plates from vibrating against the supporting edges when the brake assembly is not actuated. The anti-rattle spring clip is also readily accessible through the caliper aperture.

The invention may also be embodied in other specific forms without departing from the spirit or essential characteristics thereof. The foregoing description is therefore to be considered as illustrative and not restrictive, the scope of the invention being defined by the appended claims and all changes which come within the meaning and range of equivalency of the claims are therefore intended to be embraced thereby.

I claim:

1. In a disc brake, a rotor having axially spaced friction braking surfaces, a caliper including a leg extending radially inward adjacent a friction surface of said rotor, a wall extending radially inward adjacent the other friction surface and said rotor and a bridge straddling the periphery of said rotor and joining said leg and said wall, load applying means carried by said wall, a first friction pad between said leg of said caliper and said adjacent friction surface of said rotor, a second friction pad between said load applying means and said other friction surface of said rotor, each said friction pad comprising a backing plate having a tab extending radially outward therefrom bounded by circumferentially spaced, radially converging edges and a radially outer edge, friction material secured to a part of said backing plate, an aperture in said bridge defined on two sides by circumferentially spaced, axially extending, radially converging edges, said circumferentially spaced converging edges of said backing plate tabs slidably mounting said friction pads on said radially converging edges of said aperture and an anti-rattle spring clip having segments thereof formed to abut and abutting the radially outer edges of said first and second friction pad backing plate tabs in said aperture and other segments formed to extend radially inward and under said radially converging edges of said aperture to engage a surface of said bridge and spring load said segments abutting said first and second friction pad backing tabs thereby urging said circumferentially spaced converging edges of said friction pad backing plate(s) into anti-rattle abutment with said radially converging edges of said aperture.

2. The disc brake defined by claim 1 wherein said anti-rattle spring clip is comprised of two spaced legs joined by an intermediate segment, each of said clip legs adjacent said intermediate segment abuts a circumferentially spaced area of the radially outer edge of said first friction pad backing plate tab, the ends of said legs abut circumferentially spaced areas of the radially outer edge of said second friction pad backing plate tab and segments of said legs between said segments abutting said first and second friction pad backing plate tabs extend radially inward and under said radially converging edge of said aperture.

3. The disc brake defined by claim 2 wherein the ends of said legs are formed to abut circumferentially spaced areas of the radially outer edge of said second friction pad backing plate tab over a substantial length of said legs to permit axial movement of said second friction pad backing plate toward said first friction pad.

* * * * *